United States Patent
Keller et al.

(10) Patent No.: US 9,279,497 B2
(45) Date of Patent: *Mar. 8, 2016

(54) CONNECTING DEVICE FOR OUTSIDE A VARIABLE-SPEED TRANSMISSION

(75) Inventors: Reiner Keller, Bodman-Ludwigshafen (DE); Frank Richter, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 213 days.

This patent is subject to a terminal disclaimer.

(21) Appl. No.: 14/124,775

(22) PCT Filed: May 2, 2012

(86) PCT No.: PCT/EP2012/057966
§ 371 (c)(1),
(2), (4) Date: Dec. 16, 2013

(87) PCT Pub. No.: WO2012/171709
PCT Pub. Date: Dec. 20, 2012

(65) Prior Publication Data
US 2014/0116180 A1    May 1, 2014

(30) Foreign Application Priority Data

Jun. 17, 2011   (DE) .......................... 10 2011 077 748

(51) Int. Cl.
*F16D 7/00*   (2006.01)
*F16H 61/68*  (2006.01)
(Continued)

(52) U.S. Cl.
CPC .............. *F16H 61/68* (2013.01); *B60K 17/344* (2013.01); *F16D 11/10* (2013.01); *F16D 13/04* (2013.01);
(Continued)

(58) Field of Classification Search
CPC .................. F16H 61/68; F16H 63/304; F16H 2063/3056; F16H 2063/305; F16H 63/18; B60K 17/344; F16D 13/52; F16D 13/04; F16D 11/10
See application file for complete search history.

(56) References Cited

U.S. PATENT DOCUMENTS 1,367,309 A      2/1921  Dunham
2,894,775 A  *   7/1959  Harless ............... B41F 13/0008
                                                    192/114 R
(Continued)

FOREIGN PATENT DOCUMENTS

DE            30 14 358 A1     11/1980
DE            199 20 064 A1    11/2000
(Continued)

OTHER PUBLICATIONS

German Search Report Corresponding to 10 2011 077 748.2 mailed Mar. 23, 2012.
(Continued)

*Primary Examiner* — David J Hlavka
(74) *Attorney, Agent, or Firm* — Davis & Bujold PLLC; Michael J. Bujold (57) ABSTRACT

A connecting device of a vehicle drive-train, located outside a variable-speed transmission, for rotationally coupling a shaft to a drive-train element. A sliding sleeve is rotationally fixed on the shaft but slides axially between first and second positions. In the first position, the shaft is rotationally disengaged from the drive-train element and, in the second position, they are rotationally coupled. An actuator displaces the sliding sleeve between the first and second positions, with a shift groove along a peripheral contour of the sliding sleeve and engagement members for engaging in the groove. The sliding sleeve can rotate and move axially relative to the engagement members and the groove is shaped as a curved guiding such that, when the engagement members engage in the groove and the sliding sleeve rotates relative to the engagement member, the sliding sleeve moves axially between the first and second positions by virtue of the groove.

12 Claims, 3 Drawing Sheets

(51) Int. Cl.
*F16D 11/10* (2006.01)
*B60K 17/344* (2006.01)
*F16D 13/04* (2006.01)
*F16D 13/52* (2006.01)
*F16H 63/30* (2006.01)
*F16D 23/12* (2006.01)
*F16H 63/18* (2006.01)

(52) U.S. Cl.
CPC .............. *F16D 13/52* (2013.01); *F16H 63/304* (2013.01); *F16D 2023/123* (2013.01); *F16H 63/18* (2013.01); *F16H 2063/305* (2013.01); *F16H 2063/3056* (2013.01); *Y10T 74/20177* (2015.01)

(56) References Cited

U.S. PATENT DOCUMENTS

| | | | |
|---|---|---|---|
| 4,244,455 A | 1/1981 | Loker | |
| 4,319,495 A | 3/1982 | Salicini | |
| 4,368,808 A | 1/1983 | Teraoka | |
| 5,735,176 A * | 4/1998 | Winkam | F16H 63/18 74/337.5 |
| 6,003,649 A * | 12/1999 | Fischer | F16H 61/28 192/3.58 |
| 6,634,247 B2 * | 10/2003 | Pels | B60K 6/26 477/6 |
| 6,729,458 B2 * | 5/2004 | Blechschmidt | F16D 23/06 192/108 |
| 6,886,673 B2 * | 5/2005 | Burger | F16D 11/04 192/53.361 |
| 8,689,656 B2 * | 4/2014 | Richter | F16H 63/304 192/53.33 |
| 9,016,453 B2 * | 4/2015 | Albrecht | F16D 11/14 192/69.9 |
| 2002/0153220 A1 | 10/2002 | Dick | |
| 2004/0112702 A1 * | 6/2004 | Stevenson | F16D 28/00 192/70.23 |
| 2008/0229873 A1 * | 9/2008 | Jansson | F16H 63/18 74/567 |
| 2012/0017716 A1 * | 1/2012 | Neelakantan | F16H 61/30 74/473.11 |
| 2012/0255382 A1 | 10/2012 | Richter et al. | |
| 2013/0199885 A1 | 8/2013 | Quehenberger et al. | |

FOREIGN PATENT DOCUMENTS

| | | |
|---|---|---|
| DE | 600 01 023 T2 | 8/2003 |
| DE | 10 2008 027 775 A1 | 12/2009 |
| DE | 10 2009 054 942 A1 | 6/2011 |

OTHER PUBLICATIONS

International Search Corresponding to PCT/EP2012/057966 mailed Aug. 16, 2012.

Written Opinion Corresponding to PCT/EP2012/057966 mailed Aug. 16, 2012.

* cited by examiner

CONNECTING DEVICE FOR OUTSIDE A VARIABLE-SPEED TRANSMISSION

This application is a National Stage completion of PCT/EP2012/057966 filed May 2, 2012, which claims priority from German patent application serial no. 10 2011 077 748.2 filed Jun. 17, 2011.

FIELD OF THE INVENTION

The invention relates to a connecting device of a vehicle drive-train, outside a variable-speed transmission, for the rotary coupling of a vehicle shaft to a vehicle drive-train element that can rotate relative thereto, in particular a second vehicle shaft or a housing, and to a transfer box of a vehicle drive-train.

BACKGROUND OF THE INVENTION

From DE 600 01 023 T2 a shifting device of a geared variable-speed transmission is known, in which sliding sleeves can be displaced axially by actuating means in the form of gearshift forks associated therewith, in order by virtue of the axial movement concerned to select an associated transmission ratio of the geared variable-speed transmission in a controlled manner. In this context it is generally known that the sliding sleeves are in each case arranged in a rotationally fixed and axially movable manner on a transmission shaft which, in addition, supports a loose wheel at least on one side close to the sliding sleeve concerned. In this case these loose wheels are fitted to rotate freely on the transmission shaft and mesh permanently with pinions of a further transmission shaft arranged as a countershaft or as a parallel input or output shaft. The gear ratios of the geared variable-speed transmission that can be engaged are then defined in accordance with the tooth number ratios of the gearwheels that mesh with one another in each case. When any particular sliding sleeve moves from a neutral position toward an engaging position in the direction of the loose wheel concerned, when the engaging position is reached the loose wheel is coupled by the sliding sleeve to the transmission shaft and thereby the rotational speeds and torques defined in each case are transmitted from the one transmission shaft to the other transmission shaft.

In DE 600 01 023 T2 the shift forks of the individual sliding sleeves are designed to be axially displaceable on a common control shaft, which by virtue of a pinion arranged at its end can be rotated selectively by an electric control element. In addition a cylinder is positioned on the control shaft and firmly connected thereto, which cylinder has on an outer diameter a groove that is curved in the axial direction. Furthermore, on the cylinder is fitted a sleeve which engages with a pin formed on its inside diameter in the groove of the cylinder, so that when the control shaft is rotated the sleeve moves axially along the cylinder in accordance with the shape of the cylinder groove. On its outside diameter the sleeve has shift fingers which, depending on the angular position of the sleeve, come in contact with one of the shift forks and accordingly transmit the axial movement of the sleeve to the fork concerned. During this, in order to adjust the particular angular position of the sleeve, the sleeve is connected by gearing to an intermediate shaft which, in turn, is in contact with the control shaft by way of a gearwheel.

When the control shaft is rotated by the electric control element the sleeve is moved in the axial direction in accordance with the rotation of the cylinder and thereby carries one of the shift forks with it, so that ultimately a movement of the sliding sleeve concerned and thus the engagement of an associated gear ratio takes place. In accordance with the gear ratio between the control shaft and the intermediate shaft, when the control shaft turns, the intermediate shaft also rotates the sleeve relative thereto, so that in accordance with the shifting sequence of the transmission the shift fingers come into contact with the individual shift forks. Thus, when the electric control element is actuated a sequential upshift or downshift can be carried out.

The previously unpublished DE 10 2009 054 942 by the present applicant proposes an internal shifting device for a geared variable-speed transmission, for engaging one of several shiftable gear ratios of the geared variable-speed transmission, which has a shift sleeve arranged in a rotationally fixed manner but axially movably on a transmission shaft. In this case when the shifting device is actuated, actuating means engage in at least one shift groove provided on a peripheral contour of the shift sleeve, which groove has a curved shape, so that when the transmission shaft is rotated the shift sleeve is moved axially in accordance with the shape of the shift groove. This couples the transmission shaft to a loose wheel positioned near it. Since the shifting device proposed in DE 10 2009 054 942 is explicitly intended for a geared variable-speed transmission for engaging one of several shiftable gear ratios of the transmission and for this purpose a loose wheel is necessarily presupposed, the device is not suitable just as it is for applications outside a geared variable-speed transmission, for example in a one-stage transfer box of a vehicle drive-train.

SUMMARY OF THE INVENTION

Starting from the aforesaid prior art the purpose of the present invention can be regarded as to provide a simple device for connecting a vehicle shaft to another vehicle drive-train element for use outside a geared variable-speed transmission, in particular for a transfer box of a vehicle drive-train.

This objective is achieved by a connecting device and a transfer box according to the description.

Accordingly, the connecting device according to the invention comprises a sliding sleeve arranged in a rotationally fixed manner and axially movably on the vehicle shaft between at least a first and a second position, such that in the first position the sliding sleeve decouples the vehicle shaft rotationally from the vehicle drive-train element and in the second position it couples them rotationally. Furthermore the connecting device comprises actuating means for moving the sliding sleeve between the first and second positions, with at least one shift groove along a peripheral contour of the sliding sleeve, and also engagement means for engaging in the shift groove. In this case the sliding sleeve can both rotate and move axially relative to the engagement means, the shift groove being designed in the form of a guiding curve such that when the engagement means engage in the shift groove and the sliding sleeve rotates relative to the engagement means, the sliding sleeve is moved axially by virtue of the shift groove between the first and second positions.

Thus, when the vehicle shaft and along with it the sliding sleeve are rotated, then when the engagement means are engaged the sliding sleeve is moved axially to the first or second position whereby the vehicle shaft and the vehicle drive-train element are either coupled rotationally to one another, i.e. so that torque can be transmitted, or (rotationally) decoupled from one another.

The transfer box according to the invention comprises such a connecting device. Basically, however, the proposed connecting device can also be used outside a geared variable-speed transmission for any other applications in a vehicle drive-train, for example in order to couple and decouple an auxiliary drive output (such as a power take-off shaft or similar) of the vehicle drive-train.

Preferably the vehicle drive-train element is in the form of a second vehicle shaft, so that torque can be transmitted between the two shafts, or the vehicle drive-train element is a housing, for example a transfer box housing, so that torque of the vehicle shaft can be supported against the housing.

Compared with the devices known from the previously published prior art, this requires a smaller number of components. Furthermore the force needed for coupling or decoupling the vehicle shaft to or from the vehicle drive-train element is derived from the rotational movement of the sliding sleeve on the vehicle shaft, and does not have to be applied by the connecting device itself. The connecting device can accordingly be made small and with few components.

Compared with the previously unpublished DE 10 2009 054 942 the present invention differs in that it serves to couple the vehicle shaft and the vehicle drive-train element outside a geared variable-speed transmission, in particular in a transfer box of a vehicle drive-train. Preferably, such a transfer box has a single gear ratio between a drive input and at least one first and second drive output of the transfer box. Such a transfer box can be for example a transverse or longitudinal transfer box, the first of these also being known as an axle differential transmission while the latter is also called an all-wheel transfer box. By means of the proposed connecting device the drive input of the transfer box can be coupled to and decoupled from the first and/or second drive output of the transfer box. Thus, the invention is preferably a connecting device of a transfer box, or in other words a transfer box connecting device.

Preferably, the connecting device has a housing within which the vehicle shaft is mounted to rotate, if necessary in a fixed position in the axial direction. In that case, when engaged in the shift groove the engagement means are positionally fixed relative to the housing. Thus, relative to the engagement means and the housing, the sliding sleeve can rotate and move axially, whereby when the engagement means are engaged in the shift groove and at the same time the sliding sleeve is rotated, owing to the curved shape of the shift groove the sliding sleeve is moved axially to the first or second position. In particular, the housing can be a transfer box housing.

In a preferred further development of the connecting device according to the invention, the engagement means can be shifted into and out of engagement with the respectively associated shift groove. In this way the vehicle shaft is coupled to or decoupled from the vehicle drive-train element only as necessary, in particular when the engagement means are engaged with the shift groove. In this case the engagement means can be moved in and/or out relative to the shift groove preferably mechanically, for example by spring means or a manual switch, or hydraulically, for example by a hydraulic piston, or pneumatically, for example by a pneumatic piston, or electromagnetically, for example by an electric motor or a pulling or a press electromagnet. It is also possible to use different actuation principles for moving in and out, for example moving out can be done by spring means and moving in electromagnetically or in some other way. If the moving in or out is done by spring means, i.e. by the relaxation of the spring means, then it is preferable to provide a switchable holding device which holds the engagement means, without energy consumption, in that position in which the spring means are stressed. For example the holding device is designed as a ball-drop device. When the holding device is released the engagement means are moved out or in due to the relaxation of the spring means. To move the engagement means in mechanically, the sliding sleeve can generally also comprise a cam which, after a predetermined rotational path, automatically moves the engagement means out of the shift groove and clear of a normal outside diameter of the sliding sleeve, i.e. it brings them out of engagement.

In particular, the engagement means comprise shiftable means, i.e. means which when actuated can move in and out for engagement in the shift groove, such as one or more shift fingers or shift pins, in order to bring the engagement means into or out of engagement with the shift groove as desired. If necessary the means comprise at least one roller which in the moved-out condition rests on the shift groove in order to reduce the friction between the shift groove and the engagement means. Alternatively, the means can also comprise a slide-block for that purpose.

Preferably, the actuating means comprise a sensor system for determining whether the engagement means are engaged or out of engagement with the shift groove concerned. If the engagement means are moved out or in electromagnetically by means of a solenoid and a movable armature, then in particular the sensor system can be designed to detect the position of the armature relative to the solenoid and from that deduce the condition (moved in or out) of the engagement means. Alternatively or in addition the sensor system can also provide on the engagement means a signal-emitting element such as a permanent magnet, whose position is recognized by a sensor element such as a Hall sensor or a reed relay, whereby it can also be ascertained whether the engagement means are "in" or "out".

In an embodiment of the invention the actuating means comprise at least a first and a second shift groove on the sliding sleeve, in particular with opposite guiding-curve curvature shapes, such that the first shift groove moves the sliding sleeve to the first position and the second shift groove moves it to the second position when the engagement means are engaged in the shift groove concerned. In other words the sliding sleeve moves one way from a starting position, which can be the first or second position, to the target position, which is then the respective, other one of the first or second positions, when the engagement means are engaged in one of the two shift grooves. And the reverse movement of the sliding sleeve from the target position back to the starting position then takes place when the engagement means are engaged in the other of the two shift grooves. For this purpose the engagement means can comprise in particular at least two means for engaging in the shift grooves, for example in each case a shift finger or shift pin, of which in each case one is associated respectively with one of the shift grooves, i.e. it can only engage in its associated shift groove. In that way the to-and-fro movements can be determined precisely and independently of one another by the shape of the respective shift groove, and can for example bring about a smooth coupling or decoupling process.

In an embodiment of the invention the shift groove or grooves has/have at least one end area in which the shift groove(s) taper(s) off on an outer surface of the sliding sleeve, in particular at the level of an outside diameter of the sliding sleeve. This has the advantage that when the sliding sleeve has reached the desired position, the engagement means do not have to be extracted from the shift groove in any special manner, but rather, they move back to the "out" position automatically due to the tapering off of the groove.

A further advantageous embodiment feature of the invention is that the engagement means are arranged on opposite radial sides of the at least one sliding sleeve. This opposite positioning of engagement means around the sliding sleeve prevents any tilting or canting of the sliding sleeve as it undergoes its axial movement.

In a further development of the connecting device the sliding sleeve has retaining means which hold the sliding sleeve in the first and/or in the second position. Expediently, the retaining means are in the form of at least one spring-loaded ball which is located in an associated recess of the first vehicle shaft and which, in the first position and/or the second position of the sliding sleeve, co-operates with retaining grooves on the sliding sleeve that are opposite it in those positions. The retaining means greatly reduce the risk of any unwanted drifting of the sliding sleeve back out of the respective position to which it has selectively been moved by the actuating means. In this case ball-type retaining means can be incorporated between the first vehicle shaft and the sliding sleeve with little cost and effort and in a space-saving manner. Moreover, the force in each case for holding the sliding sleeve in the desired position can be defined in accordance with the spring loading of the at least one ball.

A further development provides that the sliding sleeve itself comprises frictional or interlocking connecting means that can be brought into rotationally fixed connection with the vehicle drive-train element, so that in the second position of the sliding sleeve the means directly couple the vehicle shaft rotationally to the vehicle drive-train element. In particular the connecting means can be in the form of one or more friction linings on the sliding sleeve, which in the second position co-operate frictionally with one or more corresponding surfaces of the vehicle drive-train element, or they can be in the form of one or more claws or teeth on the siding sleeve, which in the second position co-operate in an interlocking manner with corresponding complementary claws or teeth on the vehicle drive-train element. Accordingly there is no need for additional connecting means between the vehicle shaft and the vehicle drive-train element, such as an extra clutch, so that fewer components are required. In other words, in this case the torque is transmitted directly by way of the sliding sleeve without additional connecting means. Thus, the torque transmitted from the vehicle shaft to the vehicle drive-train element passes directly by way of the sliding sleeve.

Alternatively it is provided that the sliding sleeve acts axially upon frictional or interlocking connecting means, which in the second position of the sliding sleeve couple the vehicle shaft rotationally to the vehicle drive-train element. In this case the rotational coupling takes place not directly by the sliding sleeve itself, but indirectly by the extra connecting means, for example an additional clutch which is actuated by the sliding sleeve when it moves axially from the first to the second position. The connecting means can with equal effect be in the form of an interlocking claw clutch or a frictional disk clutch. In this case it can also be provided that the sliding sleeve acts upon the connecting means by way of one or more spring elements, for example cup springs or spiral springs. In other words, between the sliding sleeve and the connecting means are arranged one or more spring elements by way of which the sliding sleeve acts upon the connecting means. Thus, an actuating force of the sliding sleeve is not transmitted directly to the connecting means, whereby a smooth coupling or decoupling of the vehicle shaft respectively to or from the vehicle drive-train element can take place. In this case, i.e. when additional connecting means are provided, the torque is transmitted exclusively or at least for the most part by the additional connecting means. This means that the torque transmitted from the vehicle shaft to the vehicle drive-train element is not, or only to a small extent passed on by the sliding sleeve, which can accordingly be less robustly constructed and if necessary also smaller.

In both cases the connecting means can also be designed as interlocking, with frictional synchronization.

BRIEF DESCRIPTION OF THE DRAWINGS

Below, the invention is explained in more detail with reference to examples and drawings from which further advantageous design features and characteristics of the invention emerge. The drawings show, in each case represented schematically.

DETAILED DESCRIPTION OF THE PREFERRED EMBODIMENTS

In the figures the same or functionally equivalent components are provided with the same indexes.

Figure 1:
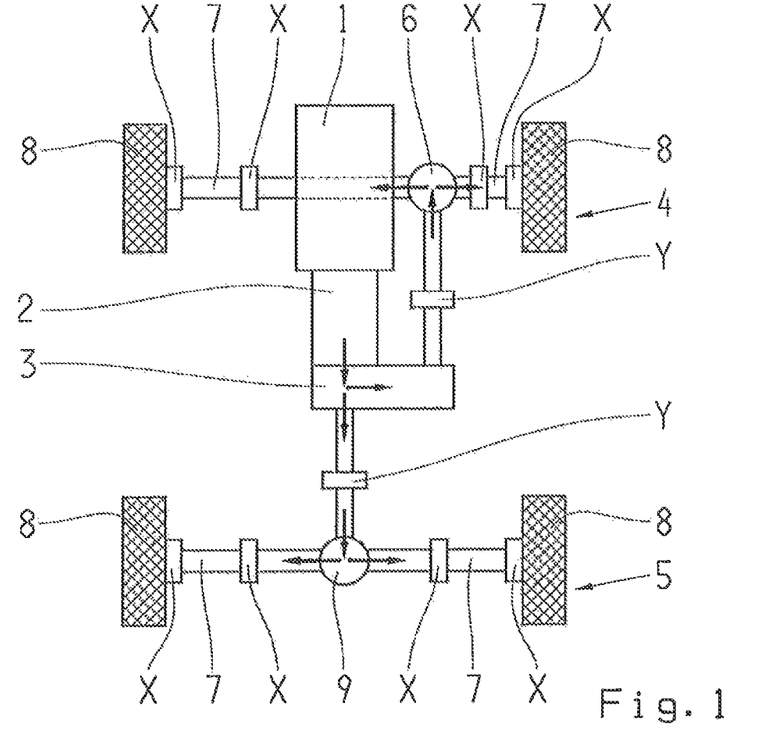
FIG. 1: A top view of a vehicle drive-train.

The all-wheel vehicle drive-train shown as an example in FIG. 1, also referred to as a 4WD drive-train, comprises a drive engine 1, for example an internal combustion engine, an electric motor, or an internal combustion engine-electric motor hybrid drive unit. On the output side of the drive engine 1 is connected a conventional geared variable-speed transmission 2, for example a manual or automated multi-speed transmission of countershaft design. Not shown in this illustration is that a separator clutch, i.e. a starting clutch can be in driving connection between the drive engine 1 and the geared variable-speed transmission 2. In this case the drive engine 1 and the geared variable-speed transmission 2 are configured for front longitudinal mounting, but other configurations are also conceivable, for example front transverse mounting or a central engine arrangement.

As a rule, within the geared variable-speed transmission 2 one of several possible gears is engaged by a shifting mechanism, depending on the driving situation, in order to step up or step down torque delivered by the drive engine 1. Flanged directly onto the geared variable-speed transmission 2 and outside the geared variable-speed transmission 2, the drive-train comprises a first transfer box 3, to be specific a longitudinal transfer box, which distributes the output torque of the geared variable-speed transmission 2 to a front axle 4 and a rear axle 5 (as indicated by the arrows shown). In this case the first transfer box 3 can comprise integrally one of the connecting devices according to the invention, in order to form a drive coupling between the transfer box 3 and the front axle 4 and/or the rear axle 5, or to decouple it/them therefrom. Thereby, it is possible optionally to transmit to the respective axle 4, 5 either no torque at all, or a maximum possible torque, or by operating the connecting device in a slipping mode a specified, limited torque.

Alternatively or in addition, between the first transfer box 3 and the front and/or rear axle 4, 5 there can also be arranged one or more of the connecting devices, by means of which the respective axles 4, 5 can be coupled to and decoupled from the transfer box 3. Example mounting locations from this are marked with the index Y.

Starting from the first transfer box 3, the torque intended for the front axle 4 is transmitted to a second transfer box 6, in this case a transverse transfer box for the front axle 4, where in turn it is distributed to a right and a left wheel driveshaft 7 and from there to a right and left vehicle wheel 8 (as indicated by the arrows shown). Analogously to the front axle 4, the torque is also transmitted to vehicle wheels 8 of the rear axle 5, which for that purpose has a third transfer box 9.

Particularly when the second and/or third transfer boxes 6, 9 are designed as a locking differential transmission or as a torque-vectoring differential transmission, they can integrally comprise at least one of the connecting devices according to the invention, in order to regulate the torque transfer to the respective right and/or left wheel 8 or in order to couple or decouple the driving of the wheel 8 concerned completely to or from the rest of the vehicle drive-train. Alternatively or in addition, one or more of the connecting devices can also be arranged between one of the vehicle wheels 8 and its associated transfer box 6, 9 on or in the corresponding wheel driveshaft 7. Examples of mounting locations for this are marked with the index X.

The drive-train illustrated here is to be understood as an example, without restrictive force. To one with knowledge of the field it will be clear that the drive-train can also be designed such that only the front or the rear axle 4, 5 can be powered by the drive engine 1, i.e. it can be exclusively a so-termed 2WD drive-train. The use of the connecting device according to the invention is also not limited to multi-track vehicles, but it can also be used with single-track vehicles such as a motorcycle, a motorized roller or the like. The vehicle can also have more than two driven axles, so it can be made for example as a 6×6 or 8×8 drive-train, i.e. having 3 or 4 driven axles respectively.

Figure 2:
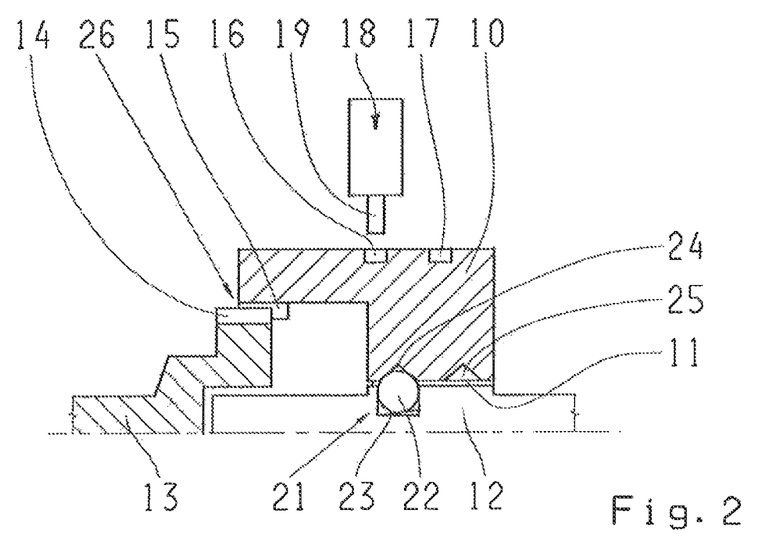
FIG. 2 A longitudinal section of the connecting device according to a first embodiment of the invention.

FIG. 2 shows a longitudinal section of a connecting device according to a first embodiment of the invention. This comprises a sliding sleeve 10 which is fitted by virtue of drive teeth 11 in a rotationally fixed manner but axially movably on a first vehicle shaft 12, and which in the axial direction is positioned close to a vehicle drive-train element in the form of a second vehicle shaft 13. This second vehicle shaft 13 can rotate relative to the first vehicle shaft 12. On one side, the side toward the sliding sleeve 10, the second vehicle shaft 13 has teeth 14 which are designed to correspond with teeth 15 on the sliding sleeve 10. In this case the teeth 14, 15 have respective tooth flanks that face toward one another and are designed in the manner of a claw clutch known to those familiar with the field. The teeth 14, 15 form connecting means 26 for the rotational coupling of the first and second vehicle shafts 12, 13. In this case, however, it is also conceivable to provide locking synchronization by designing the sliding sleeve 10 and the second vehicle shaft 13 appropriately and interposing one or more synchronization rings.

Figure 3:
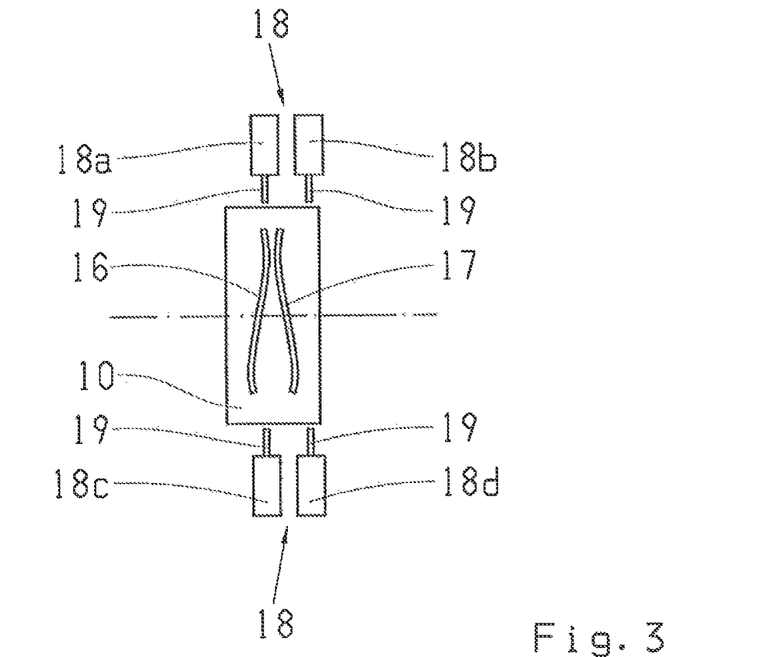
FIG. 3 A top view of a sliding sleeve and associated actuating means of the connecting device in FIG. 2.

Furthermore, on its outer peripheral contour, i.e. outside diameter, the sliding sleeve 10 has a first and a second shift groove 16, 17 which, as can be seen particularly clearly in the top view shown in FIG. 3, have a guiding curve-like shape in the axial direction. Moreover, on opposite radial sides of the sliding sleeve 10 respective engagement means are provided, here for example pairs of shift pins 18a, 18b and 18c, 18d, which when actuated by suitable means 19 such as a bolt, shift pin or shift finger, engage in the respectively associated shift groove 16 or 17. Thus, the engagement means 18 and the shift grooves 16, 17 form the actuating means of the connecting device used for moving the sliding sleeve 10.

Figure 4:
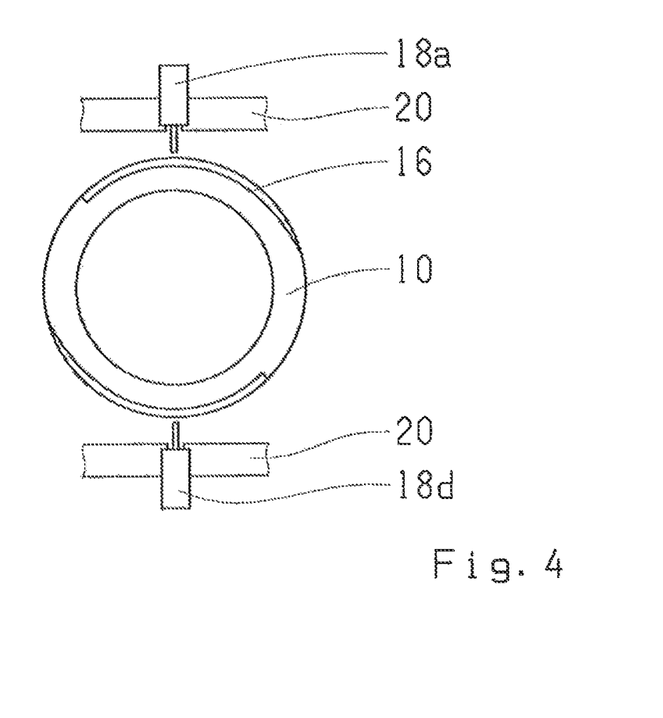
FIG. 4: A side view of the sliding sleeve and actuating means of the connecting device shown in FIG. 2.

As can be seen in particular from the side view shown in FIG. 4, the engagement means 18a to 18d are in each case fitted in a fixed position in a housing 20, so that when the engagement points of the respective engagement means 18a to 18d move in their associated shift grooves 16 or 17, owing to the axial variation of the shape of the shift grooves 16, 17 a corresponding axial displacement of the sliding sleeve 10 on the first vehicle shaft 12 is produced. During this, as the first vehicle shaft 12 and thus also the sliding sleeve 10 rotate in a corresponding rotation direction, one pair of engagement means 18a and 18c, co-operating with the first shift groove 16, bring about an axial movement of the sliding sleeve 10 from the first position, in which the vehicle shafts 12, 13 are not rotationally coupled, in the direction toward the second vehicle shaft 13, i.e. to the second position, in which the two vehicle shafts 12, 13 are coupled. And the other pair of engagement means 18b, 18d, co-operating with the second shift groove 17, bring about a reverse movement of the sliding sleeve 10 away from the second vehicle shaft 13, whereby the sliding sleeve 10 is moved from the second position back to the first position. The respective engagement means pairs 18a, 18c or 18b, 18d are preferably, but not necessarily positioned in each case on opposite radial sides of the sliding sleeve 10 as shown in FIG. 4 with reference to the engagement means pair 18a, 18d, whereby tilting of the sliding sleeve 10 during its axial movement is prevented.

The engagement means 18a to 18d are in particular in the form of electromagnetically actuated components which, when energized, bring about the inward or outward movement of the respective means 19. However, to a person with knowledge of the field it will be clear that the engagement means 18a to 18d can just as well be designed as components which are actuated mechanically, hydraulically or pneumatically.

FIG. 2 shows the sliding sleeve 10 in its second position in which, by way of the teeth 15, it is engaged with the teeth 14 of the vehicle shaft 13. In this position the vehicle shafts 12, 13 are therefore coupled to one another in a rotationally fixed manner by the sliding sleeve 10. To now move the sliding sleeve 10 away from this second position back to the first position in which the teeth 14, 15 are no longer mutually engaged and the second vehicle shaft 13 can therefore rotate relative to the first vehicle shaft 12 (rotationally decoupled), it is only necessary to electrically actuate the engagement means 18b, 18d so that the respective means 19 engage in the associated shift groove 17. By virtue of the axial shape of the shift groove 17 and due to the conjoint rotation of the sliding sleeve 10 with the first vehicle shaft 12, the sliding sleeve 10 then moves axially away from the second vehicle shaft 13. When the first position is reached the means 19 are withdrawn, whereby the engagement means 18b, 18d come out of engagement with the shift groove 17. In this case that is made possible by the fact that the shift grooves 16, 17 are shaped in the rotational direction in their respective end areas so as to taper off on an outer surface of the sliding sleeve 10, i.e. at the level of the outside diameter of the sliding sleeve 10, as can also be seen in FIG. 4. In this way the means 19 of the engagement means 18a, 18c are automatically pushed out of the shift groove 16. The shift groove 17 is formed with such an end area, analogously to the shift groove 16. In particular, this end area of each shift groove 16, 17 can be followed by a cam which lifts the means 19 clear of the normal level of the outer surface or outside diameter of the sliding sleeve 10.

Since, once the sliding sleeve 10 has reached its desired position, the respective engagement means 18a, 18c and 18b, 18d are accordingly no longer in contact with the shift grooves 16, 17, in some circumstances undesired axial movements of the sliding sleeve 10 can take place. To prevent this, retaining means 21 are provided between the sliding sleeve 10 and the first vehicle shaft 12. These means consist of a spring-loaded ball 22 which is positioned in a recess 23 of the first vehicle shaft 12 and, in the first and second positions of the sliding sleeve 10, co-operates in each case with respective retaining grooves 24, 25 on an inside diameter of the sliding sleeve 10 opposite it. By virtue of the spring loading of the ball 22, the sliding sleeve 10 is held by the ball 22 in the position concerned. If now a change from one position to the respective other position takes place, the ball 22 is pressed back into the recess 23 until it comes in line with the respective other one of the retaining grooves 24 or 25 on the sliding sleeve 10, in which it then engages.

Figure 5:
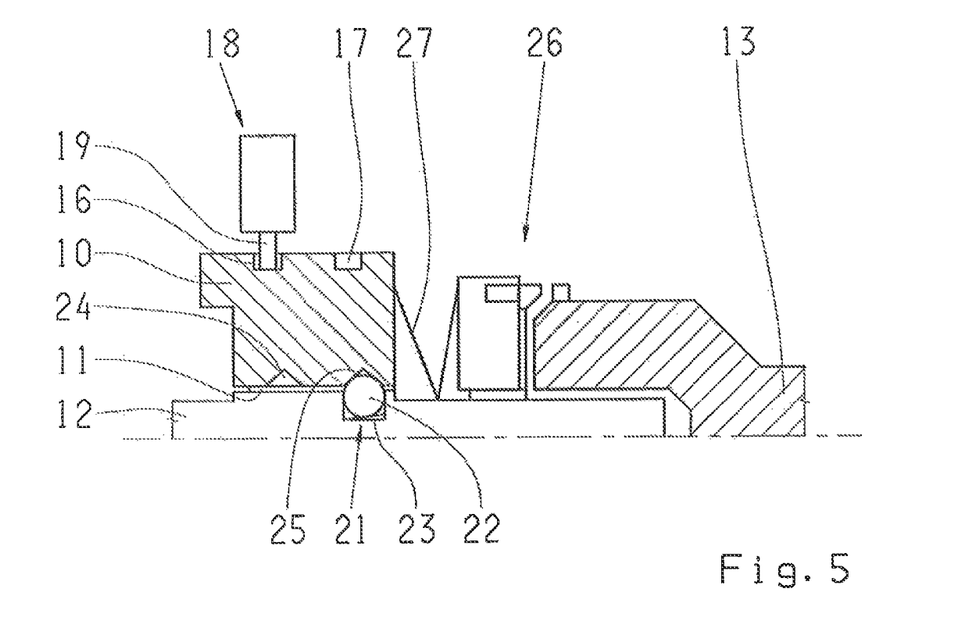
FIG. 5: A longitudinal section of the connecting device according to a further, second embodiment of the invention.

FIG. 5 shows the connecting device according to a second embodiment of the invention. In contrast to the variant shown in FIG. 1, in the second position the sliding sleeve 10 does not couple the vehicle drive-train element, in this case again in the form of a second vehicle shaft 13, directly to the first vehicle shaft 12, but instead it actuates additional connecting means 26, here for example in the form of a claw clutch with synchronization means, which rotationally couple the second vehicle shaft 13 to the first vehicle shaft 12 when the sliding sleeve 10 moves to the second position. In the case illustrated the connecting means 26 comprise a connecting sleeve with claws and synchronization means fitted axially onto the first vehicle shaft 12 in a rotationally fixed but axially displaceable manner, which when the sliding sleeve 10 moves to the second position are pressed toward and against corresponding claws of the second vehicle shaft 13, whereby rotational movements of the vehicle shafts are first synchronized so that they then interlock with one another. To be able to produce the pressing force that may be necessary for this, and for a smooth coupling of the vehicle shafts 12, 13, one or more spring elements 27, here for example in the form of cup springs, are positioned between the sliding sleeve 10 and the connecting means 26, which after being prestressed by the movement of the sliding sleeve 10 to the shift position, exert a steady pressing force on the connecting means 26. Thus, in this case the sliding sleeve 10 itself does not directly couple the first vehicle shaft 12 to the second vehicle shaft 13, but rather, this coupling takes place by way of the connecting means 26. Accordingly, the actual torque transfer between the vehicle shafts 12, 13 takes place exclusively or at least for the most part by way of the connecting means 26.

Figure 6:
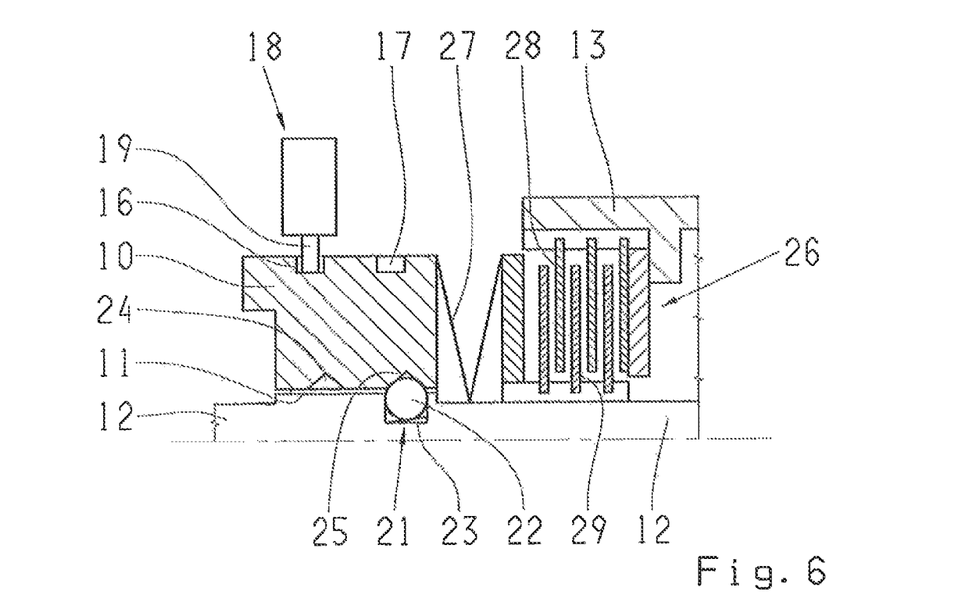
FIG. 6: A longitudinal section of the connecting device according to the invention according to a third embodiment.

FIG. 6 shows a further, third embodiment of the invention. In contrast to the previous variant shown in FIG. 5, in this case the connecting means 26 for coupling the first and second vehicle shafts 12, 13 are in the form of a disk clutch whose outer disks 28 are connected rotationally fixed to the second vehicle shaft 13 and whose inner disks 29 are connected rotationally fixed to the first vehicle shaft 12. When moved to the second position, by way of the interposed spring element 27 the sliding sleeve 10 compresses the disk clutch 26, i.e. closes it. In this case too, therefore, the first and second vehicle shafts 12, 13 are not coupled directly by the sliding sleeve 10.

INDEXES

1 Drive engine
2 Geared variable-speed transmission
3 Transfer box
4 Front axle
5 Rear axle
6 Transfer box
7 Wheel driveshaft
8 Wheel
9 Transfer box
10 Sliding sleeve
11 Drive teeth
12 Vehicle shaft
13 Vehicle shaft
14 Teeth
15 Teeth
16 Shift groove
17 Shift groove
18, 18a, . . . , d Engagement means
19 Means
20 Housing
21 Retaining means
22 Ball
23 Recess
24 Retaining groove
25 Retaining groove
26 Connection means
27 Spring element
28 Outer disks
29 Inner disks
X, Y Mounting position

The invention claimed is:

1. A connecting device of a vehicle drive-train, located outside a geared variable-speed transmission (2), for rotationally coupling a vehicle shaft (12) to a vehicle drive-train element (13, 20) that is rotatable relative to the vehicle shaft (12), the connecting device comprising:
   a sliding sleeve (10) which is arranged in a rotationally fixed manner on the vehicle shaft (12) and is axially movable on the vehicle shaft (12) between at least first and second positions such that, in the first position, the vehicle shaft (12) is rotationally decoupled from the vehicle drive-train element (13, 20) while, in the second position, the vehicle shaft (12) is rotational coupled to the vehicle drive-train element (13, 20),
   an actuating means (16, 17, 18) for displacing the sliding sleeve (10) between the first and the second positions, via at least one shift groove (16, 17) provided along a peripheral contour of the sliding sleeve (10),
   an engagement means (18) for engaging in the shift groove (16, 17),
   the sliding sleeve (10) being rotatable and axially movable relative to the engagement means (18), and
   the shift groove (16, 17, 18) having a shape of a guiding curve such that when the engagement means (18) engages in the shift groove (16, 17) and the sliding sleeve (10) rotates relative to the engagement means (18), and the sliding sleeve (10) being moved axially, between the first and the second positions, by virtue of the shift groove (16, 17).

2. The connecting device according to claim 1, wherein the engagement means (18) is switchable into and out of engagement with the shift groove (16, 17).

3. The connecting device according to claim 2, wherein the engagement means (18) is movable at least one of in and out, relative to the shift groove (16, 17), by one of a mechanical member, an electromagnetic member, a hydraulic member and a pneumatic member.

4. The connecting device according to claim 2, wherein the actuating means (16, 17, 18) comprise a sensor system for determining whether the engagement means (18) is either in or out of engagement with the shift groove (16, 17).

5. The connecting device according to claim 1, wherein the actuating means (16, 17, 18) comprise first and second shift grooves (16, 17), on the sliding sleeve (10), which have oppositely curved shapes,
  when the engagement means (18a, 18c) engages in the first shift groove (16), the sliding sleeve (10) is thereby moved to the second position, and,
  when the engagement means (18b, 18d) engages in the second shift groove (17), the sliding sleeve (10) is thereby moved to the first position.

6. The connecting device according to claim 1, wherein the shift groove (16, 17) has an end area shaped such that the shift groove tapers off onto an outside surface of the sliding sleeve (10).

7. The connecting device according to claim 1, wherein the sliding sleeve (10) has retaining unit (21) which holds the sliding sleeve (10) in at least one of the first position and the second position.

8. The connecting device according to claim 7, wherein the retaining unit (21) comprises a spring-loaded ball (22) which is positioned in an associated recess of the vehicle shaft (12) and, in at least one of the first position and the second position of the sliding sleeve (10), co-operates with respective retaining grooves (24, 25) formed in the sliding sleeve (10).

9. The connecting device according to claim 1, wherein the sliding sleeve (10) comprises either a frictional or an interlocking connection unit (15, 26) which, in the second position of the sliding sleeve (10), rotationally couples the vehicle shaft (12) to the vehicle drive-train element (13), or the sliding sleeve (10) acts axially upon the frictional or the interlocking connection unit (26) which, in the second position of the sliding sleeve (10), rotationally couples the vehicle shaft (12) to the vehicle drive-train element (13).

10. The connecting device according to claim 9, wherein the sliding sleeve (10) acts upon the interlocking connection unit (26) by way of at least one spring element (27).

11. A transfer box of a vehicle drive-train in combination with connecting device that is located outside a geared variable-speed transmission, for rotationally coupling a vehicle shaft to a vehicle drive-train element that is rotatable relative to the vehicle shaft, the vehicle drive-train element being either a second vehicle shaft or a housing, the connecting device comprising:
  a sliding sleeve which is arranged in a rotationally fixed manner on the vehicle shaft and is axially movable on the vehicle shaft between at least first and second positions such that, in the first position, the vehicle shaft is rotationally decoupled from the vehicle drive-train element while, in the second position, the vehicle shaft (12) is rotationally coupled to the vehicle drive-train element,
  an actuating means for displacing the sliding sleeve between the first and the second positions, with at least one shift groove provided along a peripheral contour of the sliding sleeve,
  an engagement means for engaging in the shift groove,
  the sliding sleeve being rotatable and axially movable relative to the engagement means, and the shift groove having a shape of a guiding curve such that when the engagement means engages in the shift groove and the sliding sleeve rotates relative to the engagement means, the sliding sleeve being moved axially, by virtue of the shift groove, between the first and the second positions.

12. A connecting device of a vehicle drive-train, the connecting device being located outside a variable-speed transmission and rotationally coupling a first shaft to a second shaft, the connecting device comprising:
  a sliding sleeve rotationally fixed to the first shaft and being axially slidable along the first shaft, along a rotational axis thereof, between first and second axial positions,
  in the first axial position, the sliding sleeve being disengaged from the second shaft such that the sliding sleeve is rotatable with respect to the second shaft, and in the second axial position, the sliding sleeve engaging with the second shaft such that the sliding sleeve and the second shaft rotate with one another,
  the sliding sleeve having an exterior surface comprising at least one curved shift groove; and
  an engagement element extending normal to the rotational axis of the first shaft and being received within the at least one shift groove, the sliding sleeve being rotatable and axially slidable with respect to the engagement element such that, when the engagement element is received within the shift groove and the sliding sleeve rotates relative to the engagement element, the sliding sleeve is moved axially between the first and second positions by virtue of the shift groove.

* * * * *